US009829635B2

(12) United States Patent
Tu et al.

(10) Patent No.: US 9,829,635 B2
(45) Date of Patent: Nov. 28, 2017

(54) OPTICAL INTERCONNECTOR, OPTOELECTRONIC CHIP SYSTEM, AND OPTICAL SIGNAL SHARING METHOD

(71) Applicant: Huawei Technologies Co., Ltd., Shenzhen (CN)

(72) Inventors: Xin Tu, Yokohama (JP); Hongyan Fu, Shenzhen (CN); Fei Zhao, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/277,931

(22) Filed: Sep. 27, 2016

(65) Prior Publication Data
US 2017/0017039 A1    Jan. 19, 2017

Related U.S. Application Data

(63) Continuation of application No. PCT/CN2014/074303, filed on Mar. 28, 2014.

(51) Int. Cl.
*G02B 6/12* (2006.01)
*G02B 6/293* (2006.01)
(Continued)

(52) U.S. Cl.
CPC ..... *G02B 6/29341* (2013.01); *G02B 6/12002* (2013.01); *G02B 6/125* (2013.01);
(Continued)

(58) Field of Classification Search
CPC ................ G02B 6/29338; G02B 6/29341
See application file for complete search history.

(56) References Cited

U.S. PATENT DOCUMENTS

| 4,630,885 A | * | 12/1986 | Haavisto | G01C 19/727 |
| | | | | 356/461 |
| 6,411,752 B1 | * | 6/2002 | Little | G02B 6/12002 |
| | | | | 385/17 |

(Continued)

FOREIGN PATENT DOCUMENTS

| CN | 101196596 A | 6/2008 |
| CN | 103353632 A | 10/2013 |

(Continued)

OTHER PUBLICATIONS

Bessette, Johnathan T., et al., "Vertically Stacked Microring Waveguides for Coupling between Multiple Photonic Planes," Optics Express, Jun. 3, 2013, vol. 21, No. 11, DOI:10.1364/OE.21.013580, 12 pages.

(Continued)

*Primary Examiner* — Rhonda Peace
(74) *Attorney, Agent, or Firm* — Slater Matsil, LLP

(57) ABSTRACT

An optical interconnector (915) includes: a first vertical coupled cavity (100), a first optical waveguide (102), and a second optical waveguide (103). The first vertical coupled cavity (100) includes N identical micro-resonant cavities that are equidistantly stacked, where a center of each micro-resonant cavity is located on a first straight line that is perpendicular to a plane on which the micro-resonant cavity is located, the first optical waveguide (102) and a first micro-resonant cavity (11) are in a same plane, the second optical waveguide (103) and a second micro-resonant cavity (13) are in a same plane, the first optical waveguide (102) is an input optical waveguide, the second optical waveguide (103) is a first output optical waveguide, and an optical signal having a first resonant wavelength in the first optical waveguide (102) enters the second optical waveguide (103) through the first vertical coupled cavity (100).

17 Claims, 4 Drawing Sheets

(51) Int. Cl.
*G02B 6/125* (2006.01)
*G02B 6/35* (2006.01)
(52) U.S. Cl.
CPC ....... *G02B 6/12007* (2013.01); *G02B 6/3536* (2013.01); *G02B 6/29395* (2013.01); *G02B 2006/12121* (2013.01); *G02B 2006/12142* (2013.01)

(56) References Cited

U.S. PATENT DOCUMENTS

| | | | | |
|---|---|---|---|---|
| 6,636,668 B1* | 10/2003 | Al-hemyari | ........ | G02B 6/12007 385/16 |
| 6,665,476 B2* | 12/2003 | Braun | ................ | G02B 6/12002 385/14 |
| 6,865,314 B1* | 3/2005 | Blair | ..................... | B82Y 20/00 385/15 |
| 7,003,185 B2* | 2/2006 | Flory | ................. | G02B 6/12002 385/15 |
| 7,184,632 B2* | 2/2007 | de Almeida | ....... | G02B 6/12007 385/39 |
| 7,251,393 B2 | 7/2007 | Stevens et al. | | |
| 7,310,031 B2* | 12/2007 | Pance | ..................... | H01P 1/162 333/202 |
| 7,382,032 B2* | 6/2008 | Kolodzey | ................. | H01S 5/30 257/428 |
| 7,462,873 B2* | 12/2008 | Hoshi | ..................... | H01S 5/426 257/88 |
| 7,536,070 B2* | 5/2009 | Rosa de Almeida | ......................... | G02B 6/12007 385/31 |
| 7,764,850 B2 | 7/2010 | Bratkovski et al. | | |
| 7,929,817 B2* | 4/2011 | Uemura | ............. | G02B 6/12007 385/24 |
| 9,122,004 B1* | 9/2015 | Roth | ..................... | G02B 6/12004 |
| 2003/0058908 A1* | 3/2003 | Griffel | .................. | H01S 5/1032 372/43.01 |
| 2004/0057684 A1* | 3/2004 | Kokubun | ............... | B82Y 20/00 385/123 |
| 2004/0114867 A1* | 6/2004 | Nielsen | ................... | G02F 1/011 385/40 |
| 2005/0047708 A1* | 3/2005 | Ma | ..................... | G02B 6/12002 385/14 |
| 2006/0078254 A1* | 4/2006 | Djordjev | ........... | G02B 6/12007 385/32 |
| 2006/0193557 A1 | 8/2006 | Bradley et al. | | |
| 2009/0103863 A1 | 4/2009 | Lee et al. | | |
| 2011/0091157 A1 | 4/2011 | Yao et al. | | |
| 2012/0045167 A1 | 2/2012 | Julien et al. | | |
| 2012/0081197 A1 | 4/2012 | Park et al. | | |
| 2012/0251042 A1 | 10/2012 | Julien et al. | | |
| 2014/0126853 A1 | 5/2014 | Peng et al. | | |
| 2016/0291251 A1* | 10/2016 | Tu | ...................... | G02B 6/29343 |
| 2017/0017039 A1* | 1/2017 | Tu | ...................... | G02B 6/12007 |

FOREIGN PATENT DOCUMENTS

| | | |
|---|---|---|
| CN | 103649798 A | 3/2014 |
| EP | 1176438 A1 | 1/2002 |
| JP | 2001228347 A | 8/2011 |
| WO | 2006076585 A2 | 7/2006 |

OTHER PUBLICATIONS

Nielsen, M., et al., "Frequency-selective 3-D integration of nanoplasmonic circuits on a Si platform," Optics Express, Apr. 9, 2012, vol. 20, No. 8, 6 pages.

Shafiei, Mehdi, et al., "Linear transmission properties of a vertically stacked multiring resonator with a defect," Applied Optics, Nov. 1, 2009, vol. 48, No. 31, 8 pages.

Sumetsky, M., "Vertically-stacked multi-ring resonator," Optics Express, Aug. 22, 2005, vol. 13, No. 17, 22 pages.

Yao, Jin, et al., "Grating-coupler based low-loss optical interlayer coupling," IEEE, Sep. 14, 2011, 8th IEEE International Conference on, IEEE, 3 pages.

Zheng, Zuezhe, et al., "Optical proximity communication using reflective mirrors," Optics Express, Sep. 15, 2008, vol. 16, No. 19, 8 pages.

* cited by examiner

OPTICAL INTERCONNECTOR, OPTOELECTRONIC CHIP SYSTEM, AND OPTICAL SIGNAL SHARING METHOD

CROSS-REFERENCE TO RELATED APPLICATIONS

This application is a continuation of International Application No. PCT/CN2014/074303, filed on Mar. 28, 2014, the disclosure of which is hereby incorporated by reference in its entirety.

TECHNICAL FIELD

Embodiments of the present invention relate to the field of optoelectronics, and in particular, to an optical interconnector, an optoelectronic chip system, and an optical signal sharing method.

BACKGROUND

The development of electronic computer and electronic communications technologies has been very mature. However, an electronic technology in which an electron is used as an information carrier is affected by a distribution latency effect, electromagnetic crosstalk, and the like. The development of the electronic technologies already meets a bottleneck, and already cannot satisfy requirements of current cloud computing or the like on a rate and communication quality of an electronic computer.

With the occurrence of monochromatic laser having high coherence, a photon having no electrical charge and distribution delay effect gradually replaces the electron and becomes an information carrier of optical communication. A photonic technology in which a photon is used as an information carrier can improve a transmission capacity, a processing speed, and a storage density of an information system. In view of the electronic computer and electronic communications technologies, a practical all-optical information system needs to be constituted by means of a fast optical switch device and optical interconnection between inside and outside of a chip. The development of such an integrated optical circuit is reflected in many aspects, such as an increase of a rate, expansion of a function, reliability and stability of a system, and compatibility with a micro-electronic system.

Considering a capability of being compatible with an existing mature micro-electronic processing technique, an integrated silicon photonic chip technology is a most potential solution for implementing functions, such as optical switching of a next generation all-optical communications network and optical interconnection between a data center and a central processing unit (CPU) of a computer. Nowadays, most optical switch nodes are implemented by using an optical add-drop multiplexer (OADM) and an optical cross-connect (OXC), and mainly depend on an optical fiber and a micro-electro-mechanical systems (MEMS) optical switch technology.

A conventional silicon photonic chip has a two-dimensional single-layer optical circuit, and a large optical energy loss caused by a waveguide intersection node in the chip limits a scale of the chip. Based on an idea of a printed circuit board (PCB) of a multi-layer circuit in an integrated circuit (IC) design, a three-dimensional photonic integrated circuit (3D-PIC) of a multi-layer integrated optical circuit is used, which can avoid the large loss caused by optical waveguide intersection. In addition, this three-dimensional photonic integrated circuit is more compact and efficient, which can increase a device density in the chip and a signal processing capability in a unit size, and also can reduce power consumption and costs.

In an electronic integrated circuit, interconnection between layers may be implemented by using a through-silicon via (TSV) technology in a multi-layer circuit board. Because of different performance of the photon and the electron, although a photonic integrated circuit may be laid out based on the electronic integrated circuit, optical signal exchange and sharing between different layers in the photonic integrated circuit cannot be implemented based on the TSV technology. That is, currently, optical signal exchange and sharing between different layers cannot be implemented in a multi-layer optical circuit.

SUMMARY

Embodiments of the present invention provide an optical interconnector, which can be used to implement optical signal exchange and sharing between different layers.

According to a first aspect, an optical interconnector is provided, where the optical interconnector includes: a first vertical coupled cavity, a first optical waveguide, and a second optical waveguide, where the first vertical coupled cavity includes N identical micro-resonant cavities, centers of the N identical micro-resonant cavities are located on a first straight line, the first straight line is perpendicular to a plane on which each micro-resonant cavity of the N identical micro-resonant cavities is located, each two adjacent micro-resonant cavities in the N identical micro-resonant cavities are spaced by a same distance, where N is an odd number that is greater than or equal to 3; and the first optical waveguide and a first micro-resonant cavity in the N identical micro-resonant cavities are in a same plane, the second optical waveguide and a second micro-resonant cavity in the N identical micro-resonant cavities are in a same plane, the first optical waveguide is an input optical waveguide of the first vertical coupled cavity, the second optical waveguide is a first output optical waveguide of the first vertical coupled cavity, and an optical signal having a first resonant wavelength in the first optical waveguide enters the second optical waveguide through the first vertical coupled cavity.

With reference to the first aspect, in a first possible implementation manner, the optical interconnector further includes a third optical waveguide, where the third optical waveguide and a third micro-resonant cavity in the N identical micro-resonant cavities are in a same plane, the third optical waveguide is a second output optical waveguide of the first vertical coupled cavity, and an optical signal having a second resonant wavelength in the first optical waveguide enters the third optical waveguide through the first vertical coupled cavity.

With reference to the first aspect or the first possible implementation manner of the first aspect, in a second possible implementation manner, N is equal to 3, and the first vertical coupled cavity includes a first outer layer micro-resonant cavity, a second outer layer micro-resonant cavity, and a middle layer micro-resonant cavity, where the first micro-resonant cavity is the first outer layer micro-resonant cavity, the second micro-resonant cavity is the second outer layer micro-resonant cavity, and the optical signal having the second resonant wavelength in the first optical waveguide enters the second optical waveguide through the first vertical coupled cavity.

With reference to the first aspect, in a third possible implementation manner, N is equal to 3, and the first vertical coupled cavity includes a first outer layer micro-resonant cavity, a second outer layer micro-resonant cavity, and a middle layer micro-resonant cavity, where the first micro-resonant cavity is the middle layer micro-resonant cavity, and the second micro-resonant cavity is the first outer layer micro-resonant cavity or the second outer layer micro-resonant cavity.

With reference to the first aspect or any one of the foregoing possible implementation manners of the first aspect, in a fourth possible implementation manner, the optical interconnector further includes positive and negative electrodes, where the first vertical coupled cavity is disposed between the positive and negative electrodes, and the positive and negative electrodes are configured to adjust a refractive index of the first vertical coupled cavity.

With reference to the first aspect or any one of the foregoing possible implementation manners of the first aspect, in a fifth possible implementation manner, the optical interconnector further includes two piezoelectric ceramics, where the first vertical coupled cavity is disposed between the two piezoelectric ceramics, and the two piezoelectric ceramics are configured to adjust the distance between each two adjacent micro-resonant cavities in the first vertical coupled cavity.

With reference to the first aspect or any one of the foregoing possible implementation manners of the first aspect, in a sixth possible implementation manner, the optical interconnector further includes a first wavelength converter, where the first wavelength converter is disposed at an input end of the first optical waveguide, and the first wavelength converter is configured to adjust a wavelength of an optical signal input by the first optical waveguide.

With reference to the first aspect or any one of the foregoing possible implementation manners of the first aspect, in a seventh possible implementation manner, the optical interconnector further includes a second wavelength converter, where the second wavelength converter is disposed at an output end of the second optical waveguide, and the second wavelength converter is configured to adjust a wavelength of an optical signal output by the second optical waveguide.

With reference to the first aspect or any one of the foregoing possible implementation manners of the first aspect, in an eighth possible implementation manner, a shape of each of the N identical micro-resonant cavities is one of the following: a circle, an ellipse, and a regular polygon.

With reference to the first aspect or any one of the foregoing possible implementation manners of the first aspect, in a ninth possible implementation manner, a distance between the first optical waveguide and the first micro-resonant cavity is 1 nm to 1000 nm, and a distance between the second optical waveguide and the second micro-resonant cavity is 1 nm to 1000 nm.

With reference to the first aspect or any one of the foregoing possible implementation manners of the first aspect, in a tenth possible implementation manner, the distance between each two adjacent micro-resonant cavities in the N identical micro-resonant cavities is 1 nm to 1000 nm.

With reference to the first aspect or any one of the foregoing possible implementation manners of the first aspect, in an eleventh possible implementation manner, the optical interconnector further includes a second vertical coupled cavity and a fourth optical waveguide, where the second vertical coupled cavity includes M identical micro-resonant cavities, centers of the M identical micro-resonant cavities are located on a second straight line, the second straight line is perpendicular to a plane on which each micro-resonant cavity of the M identical micro-resonant cavities is located, and each two adjacent micro-resonant cavities in the M identical micro-resonant cavities are spaced by a same distance, where M is an odd number that is greater than or equal to 3; and the fourth optical waveguide and a fourth micro-resonant cavity in the M identical micro-resonant cavities are in a same plane, the first optical waveguide or the second optical waveguide is an input optical waveguide of the second vertical coupled cavity, and the fourth optical waveguide is an output optical waveguide of the second vertical coupled cavity.

According to a second aspect, an optoelectronic chip system is provided, where the optoelectronic chip system includes an optical circuit layer and a circuit layer, where the optical circuit layer includes a laser, a modulator, a multi-layer switching optical circuit, and a detector, where the multi-layer switching optical circuit includes the optical interconnector according to any one of the foregoing implementation manners, and the circuit layer includes an encoder, a controller, and a processor, where the laser is configured to input a first optical signal for the modulator; the encoder is configured to input an electrical signal for the modulator; the modulator modulates the first optical signal and the electrical signal into a second optical signal, and inputs the second optical signal to the multi-layer switching optical circuit; the controller is configured to input a control signal for the optical interconnector; the detector is configured to receive an output signal of the multi-layer switching optical circuit; and the processor is configured to process an output signal of the detector.

According to a third aspect, an optical signal sharing method is provided, where the method includes: receiving, by a first optical waveguide of an optical interconnector, a first optical signal; coupling, by a first vertical coupled cavity of the optical interconnector, the first optical signal into a second optical signal, where both the first optical signal and the second optical signal include an optical signal having a first resonant wavelength; and outputting, by a second optical waveguide of the optical interconnector, the second optical signal, where the optical interconnector is the optical interconnector according to any one of the foregoing implementation manners.

With reference to the third aspect, in a first possible implementation manner, the method further includes: coupling, by the first vertical coupled cavity of the optical interconnector, the first optical signal into a third optical signal, where both the first optical signal and the third optical signal include an optical signal having a second resonant wavelength; and outputting, by a third optical waveguide of the optical interconnector, the third optical signal.

With reference to the third aspect or the first possible implementation manner of the third aspect, in a second possible implementation manner, the method further includes: coupling, by a second vertical coupled cavity of the optical interconnector, the first optical signal into a fourth optical signal, where both the first optical signal and the fourth optical signal include an optical signal having a third resonant wavelength; and outputting, by a fourth optical waveguide of the optical interconnector, the fourth optical signal.

With reference to the third aspect or the first possible implementation manner of the third aspect, in a third possible implementation manner, the method further includes: coupling, by a second vertical coupled cavity of the optical interconnector, the second optical signal into a fourth optical signal, where the fourth optical signal includes the optical signal having the first resonant wavelength; and outputting, by a fourth optical waveguide of the optical interconnector, the fourth optical signal.

The optical interconnector in the embodiments of the present invention includes a first vertical coupled cavity, a first optical waveguide, and a second optical waveguide. The first vertical coupled cavity includes N identical micro-resonant cavities, and the first optical waveguide and the second optical waveguide are respectively in planes the same as those of micro-resonant cavities at different layers. An optical signal having a first resonant wavelength in the first optical waveguide can be coupled to the second optical waveguide after passing through the first vertical coupled cavity. In this way, the optical interconnector in the embodiments of the present invention can be used to implement optical signal sharing between different layers.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 9 is a schematic diagram of a technological process for manufacturing the optical interconnector shown in FIG. 3 according to an embodiment of the present invention;

FIG. 10 is a structural diagram of an optoelectronic chip system according to an embodiment of the present invention; and FIG. 11 is a flowchart of an optical signal sharing method according to an embodiment of the present invention.

DETAILED DESCRIPTION OF ILLUSTRATIVE EMBODIMENTS

Figure 1:
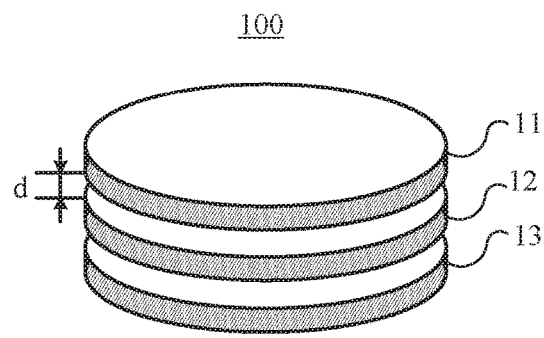
FIG. 1 is a schematic diagram of a three-layer vertical coupled cavity according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the embodiments of the present invention, a micro-resonant cavity is based on a whispering gallery mode, and the micro-resonant cavity has a small size, a high quality factor, and a high response speed, so that the micro-resonant cavity can be widely applied to a PIC chip.

The micro-resonant cavity has a multi-order resonant wavelength. For example, for a series of particular resonant modes of a micro-disk resonant cavity whose radius is R, a formula (1) is met:

$$m\lambda_{res}=2\pi nR \qquad (1)$$

where m represents a quantity of orders, n is a refractive index, and $\lambda_{res}$ is a resonant wavelength corresponding to the $m^{th}$ order resonant mode. In this way, when a sequence of optical signals whose wavelengths are $\lambda_1, \lambda_2, \lambda_3, \ldots$, is coupled to the micro-disk resonant cavity by using a straight waveguide, only an optical signal whose wavelength is the same as the resonant waveguide $\lambda_{res}$ can be resonated, and therefore, uploading and downloading of an optical signal of a particular channel can be implemented by using the micro-disk resonant cavity.

In an embodiment of the present invention, an optical interconnector is provided. The optical interconnector includes a first vertical coupled cavity, a first optical waveguide, and a second optical waveguide.

The first vertical coupled cavity includes N identical micro-resonant cavities, centers of the N identical micro-resonant cavities are located on a first straight line, the first straight line is perpendicular to a plane on which each micro-resonant cavity of the N identical micro-resonant cavities is located, and each two adjacent micro-resonant cavities in the N identical micro-resonant cavities are spaced by a same distance, where N is an odd number that is greater than or equal to 3.

The first optical waveguide and a first micro-resonant cavity in the N identical micro-resonant cavities are in a same plane, and the second optical waveguide and a second micro-resonant cavity in the N identical micro-resonant cavities are in a same plane. The first optical waveguide is an input optical waveguide of the first vertical coupled cavity, and the second optical waveguide is a first output optical waveguide of the first vertical coupled cavity. An optical signal having a first resonant wavelength in the first optical waveguide enters the second optical waveguide through the first vertical coupled cavity.

The optical interconnector in this embodiment of the present invention includes a first vertical coupled cavity, a first optical waveguide, and a second optical waveguide. The first vertical coupled cavity includes N identical micro-resonant cavities, and the first optical waveguide and the second optical waveguide are respectively in planes the same as those of micro-resonant cavities at different layers. An optical signal having a first resonant wavelength in the first optical waveguide can be coupled to the second optical waveguide after passing through the first vertical coupled cavity. In this way, the optical interconnector in this embodiment of the present invention can be used to implement optical signal sharing between different layers.

In this embodiment of the present invention, the N identical micro-resonant cavities include N micro-resonant cavity whose materials, sizes, and the like are all the same.

In this embodiment of the present invention, a size of the micro-resonant cavity in a thickness direction is relatively small. Centers of the N identical micro-resonant cavities are located on a first straight line, and the first straight line is perpendicular to a plane on which each micro-resonant cavity of the N identical micro-resonant cavities is located, which may be understood as that the first straight line extends along the thickness direction of the micro-resonant cavity.

In this embodiment of the present invention, each two adjacent micro-resonant cavities in the N identical micro-resonant cavities are spaced by a same distance, which may be understood as that the N identical micro-resonant cavities are equidistantly stacked. Specifically, the distance between each two adjacent micro-resonant cavities of the N identical micro-resonant cavities may be 1 nm to 1000 nm.

In this embodiment of the present invention, the size of the micro-resonant cavity in the thickness direction is relatively small, which may be understood as that the micro-resonant cavity has an upper plane and a lower plane that are perpendicular to the thickness direction. The first optical waveguide and the first micro-resonant cavity in the N identical micro-resonant cavities are in the same plane, which may be understood as that a straight line on which the first optical waveguide is located and an upper plane of the first micro-resonant cavity are in a same plane, or may be understood as that a straight line on which the first optical waveguide is located and a lower plane of the first micro-resonant cavity are in a same plane, or may be understood as that a straight line on which the first optical waveguide is located and a central plane of the first micro-resonant cavity are in a same plane, or may be understood as that a straight line on which the first optical waveguide is located and another plane of the first micro-resonant cavity are in a same plane. The another plane of the first micro-resonant cavity is parallel to the upper plane of the first micro-resonant cavity, and the another plane of the first micro-resonant cavity includes a point on the first micro-resonant cavity. No limitation is set thereto in the present invention.

In this embodiment of the present invention, a distance between the first optical waveguide and the first micro-resonant cavity may be 1 nm to 1000 nm, and a distance between the second optical waveguide and the second micro-resonant cavity may be 1 nm to 1000 nm.

Herein, the distance between the first optical waveguide and the first micro-resonant cavity may be understood as a distance between the straight line on which the first optical waveguide is located and the first micro-resonant cavity, or may be understood as a minimum value of a distance between any point on the first optical waveguide and any point on the first micro-resonant cavity. Similarly, the distance between the second optical waveguide and the second micro-resonant cavity may be understood as a distance between a straight line on which the second optical waveguide is located and the second micro-resonant cavity, or may be understood as a minimum value of a distance between any point on the second optical waveguide and any point on the second micro-resonant cavity.

In this embodiment of the present invention, the first vertical coupled cavity has at least two supermodes that are in one-to-one correspondence to at least two resonant wavelengths. A supermode (supermode) refers to an eigenmode of the first vertical coupled cavity. Specifically, in a resonance mode in a single micro-resonant cavity in the first vertical coupled cavity, strong interaction occurs in space by means of an evanescent wave, to form several new optical modes for an entire system, which are referred to as supermodes. The at least two supermodes are eigenmodes of the first vertical coupled cavity. Values of the at least two resonant wavelengths are related to parameters of a micro-resonant cavity, such as a shape, a size, and a refractive index. For example, if the micro-resonant cavity is a micro-disk resonant cavity, the values of the at least two resonant wavelengths are related to parameters, such as a radius and a refractive index of the micro-disk resonant cavity and a distance between each two adjacent resonant cavities.

It should be noted that, in this embodiment of the present invention, a micro-resonant cavity of the first vertical coupled cavity is a closed resonant cavity, and a shape of the micro-resonant cavity of the first vertical coupled cavity is not limited in this embodiment of the present invention. For example, the shape of the micro-resonant cavity may be any one of the following shapes: a circle, an ellipse, and a regular polygon. Alternatively, the shape of the micro-resonant cavity may be another irregular shape, for example, may be a shape in which two opposite sides of a rectangle each are combined with a semicircle. No limitation is set thereto in the present invention.

A circular micro-resonant cavity may be an annular micro-resonant cavity, or may be a disk micro-resonant cavity, which is not limited in this present invention.

It should be noted that, in this embodiment of the present invention, the size of the micro-resonant cavity in the thickness direction is relatively small. The shape of the micro-resonant cavity described herein is a shape of a plane that is perpendicular to the thickness direction of the micro-resonant cavity.

In this embodiment of the present invention, an optical waveguide may be a nanowire silicon-based optical waveguide. In this embodiment of the present invention, the optical waveguide may be a single-mode optical waveguide. In this embodiment of the present invention, a shape of the optical waveguide may be any one of the following: strip, ridge, tapered, slot, and metal plasma waveguides, which is not limited in this embodiment of the present invention.

Optionally, in this embodiment of the present invention, the optical interconnector may further include a third optical waveguide. The third optical waveguide and a third micro-resonant cavity in the N identical micro-resonant cavities are in a same plane. The third optical waveguide is a second output optical waveguide of the first vertical coupled cavity, and an optical signal having a second resonant wavelength in the first optical waveguide may enter the third optical waveguide through the first vertical coupled cavity.

In this embodiment of the present invention, a distance between the third optical waveguide and the third micro-resonant cavity may be 1 nm to 1000 nm. Herein, the distance between the third optical waveguide and the third micro-resonant cavity may be understood as a distance between a straight line on which the third optical waveguide is located and the third micro-resonant cavity, or may be understood as a minimum value of a distance between any point on the third optical waveguide and any point on the third micro-resonant cavity.

For example, when N is equal to 3, the first vertical coupled cavity includes three identical micro-resonant cavities, centers of the three identical micro-resonant cavities are located on the first straight line, and the first straight line is perpendicular to the plane on which each micro-resonant cavity of the N identical micro-resonant cavities is located, where each two adjacent micro-resonant cavities in the three identical micro-resonant cavities are spaced by a same distance. It may be understood that, the first vertical coupled cavity is formed by equidistantly and concentrically stacking the three identical micro-resonant cavities, and the straight line on which the centers of the three micro-resonant cavities are located is perpendicular to the planes on which the micro-resonant cavities are located. Herein, a first vertical coupled cavity when N is equal to 3 is referred to as a three-layer vertical coupled cavity. The first vertical coupled cavity when N=3 is shown in FIG. 1.

The three-layer vertical coupled cavity is used as an example for analysis and description in all of the following embodiments of the present invention. The three-layer vertical coupled cavity includes three identical micro-disk resonant cavities.

In this embodiment of the present invention, a radius of each micro-disk resonant cavity may be 1 μm to 10 μm.

Figure 2:
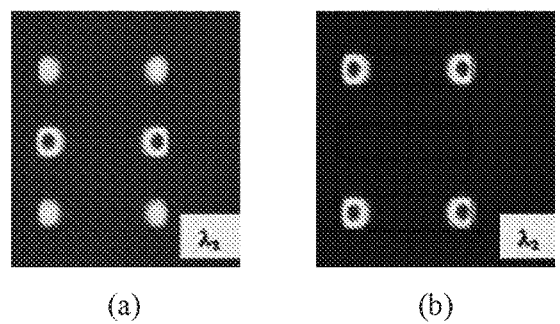
FIG. 2 is cross-sectional views of optical energy distribution in supermodes of a three-layer vertical coupled cavity according to an embodiment of the present invention.

The first vertical coupled cavity shown in FIG. 1 includes a first outer layer micro-resonant cavity 11, a second outer layer micro-resonant cavity 13, and a middle layer micro-resonant cavity 12. The first vertical coupled cavity has a first supermode corresponding to a first resonant wavelength and a second supermode corresponding to a second resonant wavelength. Cross-sectional views of optical energy distribution in the two supermodes are shown in FIG. 2. Energy in the first supermode is distributed in the first outer layer micro-resonant cavity 11, the second outer layer micro-resonant cavity 13, and the middle layer micro-resonant cavity 12, as shown in FIG. 2(a). Energy in the second supermode is distributed in the first outer layer micro-resonant cavity 11 and the second outer layer micro-resonant cavity 13, as shown in FIG. 2(b).

In this embodiment of the present invention, the first resonant wavelength corresponding to the first supermode of the first vertical coupled cavity in FIG. 1 is marked as $\lambda_1$, and the second resonant wavelength corresponding to the second supermode of the first vertical coupled cavity in FIG. 1 is marked as $\lambda_2$. Values of $\lambda_1$ and $\lambda_2$ are related to a radius R and a refractive index n of a micro-disk resonant cavity and a distance d between each two adjacent micro-disk resonant cavities.

Figure 3:
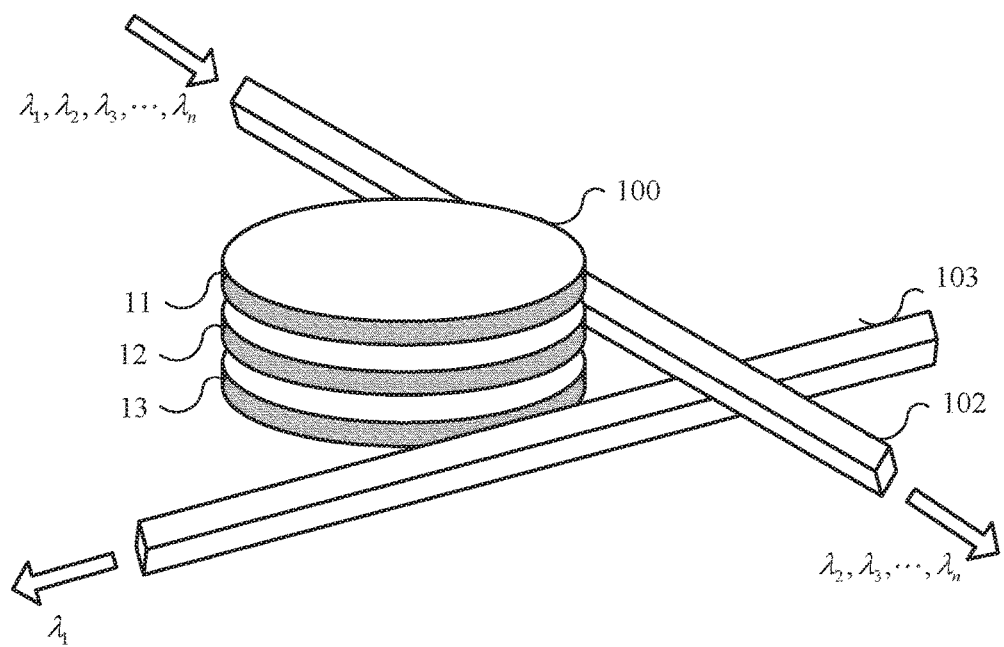
FIG. 3 is a schematic diagram of an example of an optical interconnector according to an embodiment of the present invention.

FIG. 3 is a schematic diagram of an example of an optical interconnector according to an embodiment of the present invention. The optical interconnector shown in FIG. 3 includes a first vertical coupled cavity 100, a first optical waveguide 102, and a second optical waveguide 103. The first optical waveguide 102 and a middle layer micro-resonant cavity 12 of the first vertical coupled cavity 100 are in a same plane, and the second optical waveguide 103 and a second outer layer micro-resonant cavity 13 of the first vertical coupled cavity 100 are in a same plane. In addition, the first optical waveguide 102 is an input optical waveguide of the first vertical coupled cavity 100, and the second optical waveguide 103 is a first output optical waveguide of the first vertical coupled cavity 100.

In this way, base on two supermodes of the first vertical coupled cavity 100, when a sequence of optical signals whose wavelengths are $\lambda_1, \lambda_2, \lambda_3, \ldots$, and $\lambda_n$ enters the optical interconnector from an input end of the first optical waveguide 102, because coupling may be performed between the first optical waveguide 102 and the middle layer micro-resonant cavity 12 of the first vertical coupled cavity 100 by means of an evanescent wave, the optical signals may enter the first vertical coupled cavity 100. Further, according to a first supermode of the first vertical coupled cavity 100, referring to FIG. 2, it may be determined that an optical signal whose wavelength is $\lambda_1$ may be coupled to a first outer layer micro-resonant cavity 11 and the second outer layer micro-resonant cavity 13 of the first vertical coupled cavity 100 by the middle layer micro-resonant cavity 12 of the first vertical coupled cavity 100. Further, because coupling may be performed between the second outer layer micro-resonant cavity 13 of the first vertical coupled cavity 100 and the second optical waveguide 103 by means of an evanescent wave, the optical signal whose wavelength is $\lambda_1$ may enter the second optical waveguide 103 and is output from an output end of the second optical waveguide 103. The other optical signals whose wavelengths are $\lambda_2, \lambda_3, \ldots$, and $\lambda_n$ may continue to be transmitted along the first optical waveguide 102.

It should be noted that, FIG. 3 shows only an example of an optical interconnector when N is equal to 3. For example, the optical interconnector may also be implemented as follows: the first optical waveguide 102 and the first outer layer micro-resonant cavity 11 of the first vertical coupled cavity 100 are in a same plane, and the second optical waveguide 103 and the second outer layer micro-resonant cavity 13 of the first vertical coupled cavity 100 are in a same plane. Alternatively, the optical interconnector may also be implemented as follows: the first optical waveguide 102 and the first outer layer micro-resonant cavity 11 of the first vertical coupled cavity 100 are in a same plane, and the second optical waveguide 103 and the middle layer micro-resonant cavity 12 of the first vertical coupled cavity 100 are in a same plane. No limitation is set thereto in the present invention.

Figure 4:
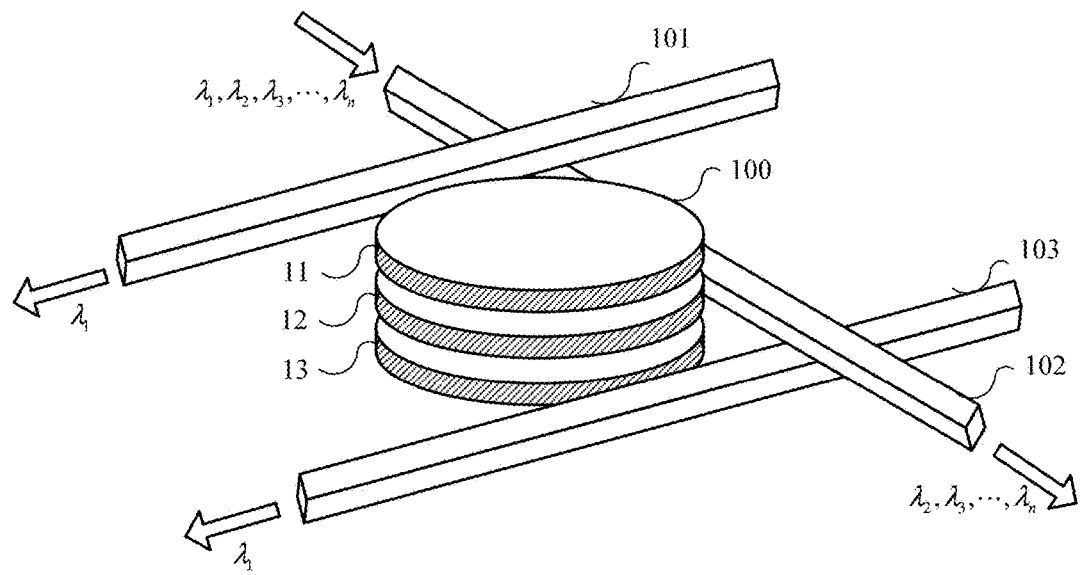
FIG. 4 is a schematic diagram of another example of an optical interconnector according to an embodiment of the present invention.

FIG. 4 is a schematic diagram of another example of an optical interconnector. Based on FIG. 3, the optical interconnector shown in FIG. 4 further includes a third optical waveguide 101, where the third optical waveguide 101 and the first outer layer micro-resonant cavity 11 are in a same plane, and the third optical waveguide 101 is a second output optical waveguide of the first vertical coupled cavity. In this way, when a sequence of optical signals whose wavelengths are $\lambda_1, \lambda_2, \lambda_3, \ldots$, and $\lambda_n$ enters the optical interconnector from an input end of the first optical waveguide 102, based on FIG. 3, FIG. 4 further shows that an optical signal whose wavelength is $\lambda_1$ enters the third optical waveguide 101 from the first vertical coupled cavity 100 and is output from an output end of the third optical waveguide 101.

That is, for a first vertical coupled cavity when N=3, when an incident optical wave includes an optical signal having a first resonant wavelength, if an input optical waveguide and a middle layer micro-resonant cavity of the first vertical coupled cavity are in a same plane, a wavelength of an optical signal of an output optical waveguide of the first vertical coupled cavity is the first resonant wavelength. The output optical waveguide of the first vertical coupled cavity and a first outer layer micro-resonant cavity or a second outer layer micro-resonant cavity may be in a same plane.

Figure 5:
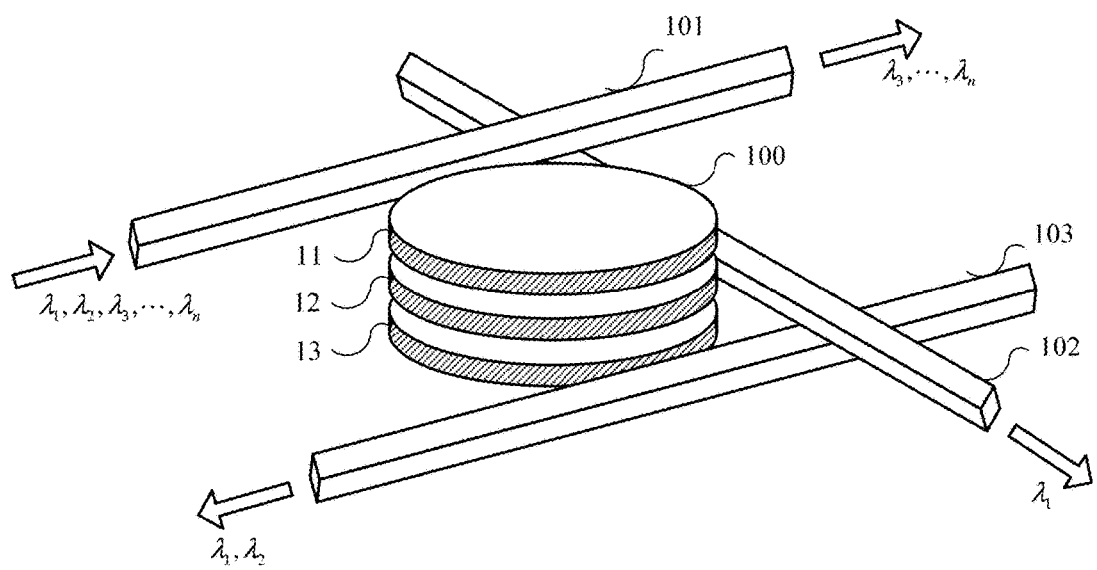
FIG. 5 is a schematic diagram of still another example of an optical interconnector according to an embodiment of the present invention.

On the other hand, for the optical interconnector shown in FIG. 4, if the third optical waveguide 101 is an input optical waveguide of the first vertical coupled cavity 100, the first optical waveguide 102 and the second optical waveguide 103 are output optical waveguides of the first vertical coupled cavity 100. As shown in FIG. 5, the input optical waveguide 101 and the first outer layer micro-resonant cavity 11 of the first vertical coupled cavity 100 are in a same plane, the first output optical waveguide 102 and the second output optical waveguide 103 are respectively in planes the same as those of the middle layer micro-resonant cavity 12 and the second outer layer micro-resonant cavity 13 of the first vertical coupled cavity 100.

In this way, when a sequence of optical signals whose wavelengths are $\lambda_1$, $\lambda_2$, $\lambda_3$, . . . , and $\lambda_n$ enters the optical interconnector from an input end of the third optical waveguide 101, because coupling may be performed between the third optical waveguide 101 and the first outer layer micro-resonant cavity 11 of the first vertical coupled cavity 100 by means of an evanescent wave, the optical signals may enter the first vertical coupled cavity 100. Further, according to a first supermode and a second supermode of the first vertical coupled cavity 100, referring to FIG. 2, it may be determined that an optical signal whose wavelength is $\lambda_1$ may be coupled to the middle layer micro-resonant cavity 12 and the second outer layer micro-resonant cavity 13 by the first outer layer micro-resonant cavity 11 of the first vertical coupled cavity 100, and an optical signal whose wavelength is $\lambda_2$ may be coupled to the second outer layer micro-resonant cavity 13 by the first outer layer micro-resonant cavity 11 of the first vertical coupled cavity 100. Further, because coupling may be performed between the middle layer micro-resonant cavity 12 of the first vertical coupled cavity 100 and the first optical waveguide 102 by means of an evanescent wave, and coupling may be performed between the second outer layer micro-resonant cavity 13 and the second waveguide 103 by means of an evanescent wave, the optical signal whose wavelength is $\lambda_1$ may enter the first optical waveguide 102 and is output from an output end of the first optical waveguide 102, and optical signals whose wavelengths are $\lambda_1$ and $\lambda_2$ may enter the second optical waveguide 103 and are output from an output end of the second optical waveguide 103. The other optical signals whose wavelengths are $\lambda_3$, . . . , and $\lambda_n$ may continue to be transmitted along the third optical waveguide 101.

That is, for a first vertical coupled cavity when N=3, when an incident optical wave has optical signals including a first resonant wavelength and a second resonant wavelength, if an input optical waveguide and any one of outer layer micro-resonant cavities of the first vertical coupled cavity are in a same plane, a wavelength of an optical signal of an output optical waveguide, in a plane the same as that of a middle layer micro-resonant cavity, of the first vertical coupled cavity is the first resonant wavelength, and wavelengths of optical signals of an output optical waveguide, in a plane the same as that of another outer layer micro-resonant cavity, of the first vertical coupled cavity are the first resonant wavelength and the second resonant wavelength.

Optionally, the optical interconnector in this embodiment of the present invention may further include positive and negative electrodes. The positive and negative electrodes may be disposed around the first vertical coupled cavity, configured to adjust a refractive index of a micro-resonant cavity in the first vertical coupled cavity. For example, the first vertical coupled cavity may be disposed between the positive and negative electrodes, and the positive and negative electrodes are configure to adjust a refractive index of the first vertical coupled cavity.

Specifically, the micro-resonant cavity in the first vertical coupled cavity may be made of a material whose refractive index is variable. For example, the material may be a III-V compound, such as silicon, germanium, indium phosphide, or gallium arsenide. In this embodiment of the present invention, a semiconductor having a high refractive index and optical nonlinear properties, such as an electro-optic effect, a thermo-optical effect, a plasma dispersion effect, and a magneto-optic effect may be used for the micro-resonant cavity.

Figure 6:
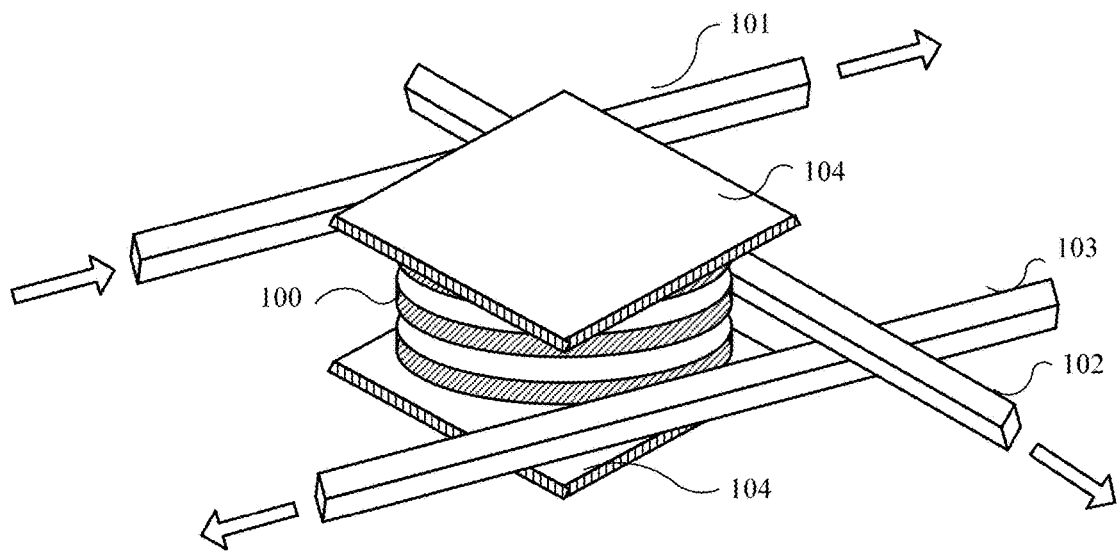
FIG. 6 is a schematic diagram of still another example of an optical interconnector according to an embodiment of the present invention.

For example, for a first vertical coupled cavity when N=3, FIG. 6 shows a schematic diagram of another example of an optical interconnector according to an embodiment of the present invention. It may be understood that, the optical interconnector in FIG. 6 is provided with positive and negative electrodes 104 based on the optical interconnector shown in FIG. 5, and the first vertical coupled cavity 100 is disposed between the positive and negative electrodes 104. In this way, a refractive index of a micro-resonant cavity in the first vertical coupled cavity 100 may be adjusted by adjusting the positive and negative electrodes 104. That is, a first resonant wavelength and a second resonant wavelength of the first vertical coupled cavity 100 are adjusted. The first resonant wavelength corresponds to a first supermode, and the second resonant wavelength corresponds to a second supermode. It may also be understood that, in this embodiment, a wavelength of an optical signal of an output optical waveguide may be adjusted by adjusting the positive and negative electrodes 104.

That is, a refractive index of a first vertical coupled cavity may be changed by means of electronic control in this embodiment of the present invention, so that a resonant wavelength corresponding to a supermode of the first vertical coupled cavity is adjusted, which can implement dynamic control on the optical interconnector.

Optionally, the optical interconnector in this embodiment of the present invention may further include two piezoelectric ceramics. The two piezoelectric ceramics may be disposed around the first vertical coupled cavity, and configured to adjust a distance between each two adjacent layers of micro-resonant cavities in the first vertical coupled cavity. For example, the first vertical coupled cavity is disposed between the two piezoelectric ceramics, and the two piezoelectric ceramics are configured to adjust a distance between each two adjacent micro-resonant cavities of the first vertical coupled cavity. Specifically, the distance between each two adjacent layers of micro-resonant cavities may be adjusted to increase or decrease by 1 nm to 100 nm by adjusting the two piezoelectric ceramics.

That is, a distance between adjacent micro-resonant cavities may be changed by using the piezoelectric ceramics in this embodiment of the present invention, so that a resonant wavelength corresponding to a supermode of the first vertical coupled cavity is adjusted, that is, a wavelength of an optical signal of an output optical waveguide of the first vertical coupled cavity may be adjusted, which can implement dynamic control on the optical interconnector.

It should be understood that, the optical interconnector in this embodiment of the present invention may include both positive and negative electrodes and two piezoelectric ceramics. In this way, a first resonant wavelength and a second resonant wavelength of the first vertical coupled cavity in the optical interconnector may be adjusted by adjusting both the positive and negative electrodes and the two piezoelectric ceramics.

Optionally, the optical interconnector in this embodiment of the present invention may further include a first wavelength converter and/or the second wavelength converter.

The first wavelength converter may be disposed at an input end of the first optical waveguide, and configured to adjust a wavelength of an optical signal input by the first optical waveguide.

A second wavelength converter may be disposed at an output end of the second optical waveguide, and configured to adjust a wavelength of an optical signal output by the second optical waveguide.

It should be understood that, in this embodiment of the present invention, when the optical interconnector includes a third optical waveguide, the optical interconnector may further include a third wavelength converter, where the third wavelength converter may be disposed at an output end of the third optical waveguide, and configured to adjust a wavelength of an optical signal output by the third optical waveguide.

Figure 7:
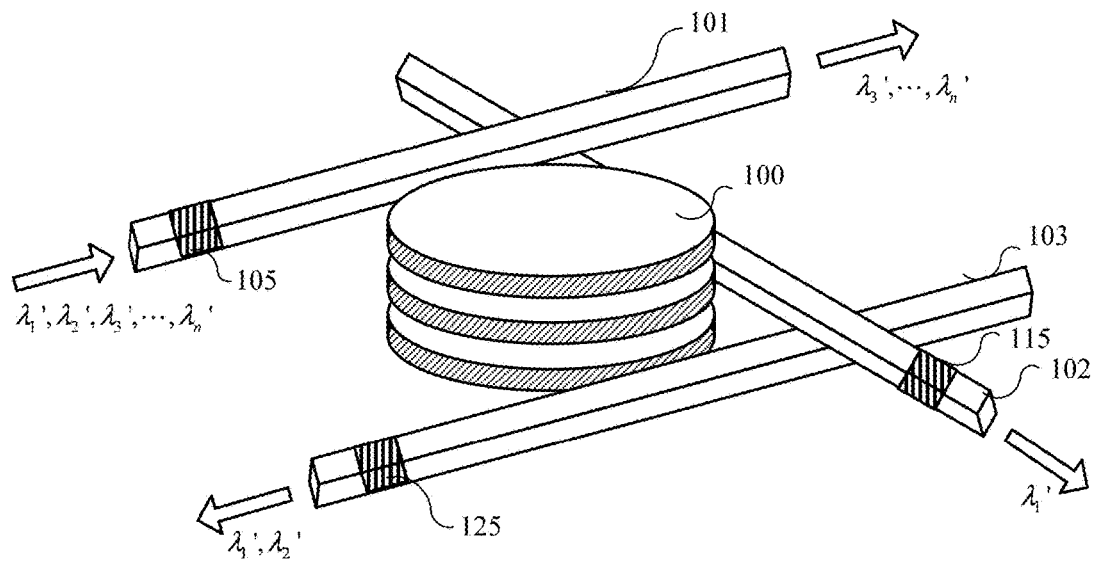
FIG. 7 is a schematic diagram of still another example of an optical interconnector according to an embodiment of the present invention.

For example, for a first vertical coupled cavity when N=3, FIG. 7 shows a schematic diagram of another example of an optical interconnector according to an embodiment of the present invention. It may be understood that, the optical interconnector in FIG. 7 is provided with three wavelength converters based on the optical interconnector shown in FIG. 5, which are respectively a first wavelength converter 105, a second wavelength converter 115, and a third wavelength converter 125, where the first wavelength converter 105 is disposed at an input end of the input optical waveguide 101, the second wavelength converter 115 is disposed at an output end of the first output optical waveguide 102, and the third wavelength converter 125 is disposed at an output end of the second output optical waveguide 103. In this way, the first wavelength converter 105 disposed at the input end of the input optical waveguide 101 may convert optical signals whose wavelengths are different from a first resonant wavelength and a second resonant wavelength into optical signals including the first resonant wavelength and/or the second resonant wavelength, then according to a routing manner shown in FIG. 5, the optical signals may be transmitted to other layers of optical circuits by using the first vertical coupled cavity, and finally wavelengths of output optical signals are converted into signals having required wavelengths by the second wavelength converter 115 disposed at the output end of the output optical waveguide 102 and the third wavelength converter 125 disposed at the output end of the output optical waveguide 103.

For example, when a sequence of optical signals whose wavelengths are $\lambda_1, \lambda_2, \lambda_3, \ldots,$ and $\lambda_n$ enters the input end of the input optical waveguide 101, the wavelengths of the optical signals may be converted to $\lambda_1', \lambda_2', \lambda_3', \ldots,$ and $\lambda_n'$ by the first wavelength converter 105. A wavelength of an optical signal that is coupled to the output optical waveguide 102 is $\lambda_1$, and the wavelength of the optical signal may be converted to $\lambda_1'$ by the second wavelength converter 115 and is output from the output end of the output optical waveguide 102. Wavelengths of optical signals that are coupled to the output optical waveguide 103 are $\lambda_1$ and $\lambda_2$, and the wavelengths of the optical signals may be converted to $\lambda_1'$ and $\lambda_2'$ by the third wavelength converter 125 and is output from the output end of the output optical waveguide 103. The rest optical signals whose wavelengths are $\lambda_3', \lambda_4', \ldots,$ and $\lambda_n'$ are output from the output end of the optical waveguide 101.

That is, in this embodiment of the present invention, a wavelength of an optical signal of an input optical waveguide of the first vertical coupled cavity may be changed by using the first wavelength converter, and/or a wavelength of an optical signal of an output optical waveguide of the first vertical coupled cavity may be changed by using the second wavelength converter, which can expand a scheduling function of the optical interconnector.

Optionally, in an embodiment, the optical interconnector in this embodiment of the present invention may further include a second vertical coupled cavity and a fourth optical waveguide.

The second vertical coupled cavity includes M identical micro-resonant cavities, centers of the M identical micro-resonant cavities are located on a second straight line, the second straight line is perpendicular to a plane on which each micro-resonant cavity of the M identical micro-resonant cavities is located, and each two adjacent micro-resonant cavities in the M identical micro-resonant cavities are spaced by a same distance, where M is an odd number that is greater than or equal to 3.

The fourth optical waveguide and a fourth micro-resonant cavity in the M identical micro-resonant cavities are in a same plane. The first optical waveguide or the second optical waveguide may be used as an input optical waveguide of the second vertical coupled cavity, and the fourth optical waveguide is an output optical waveguide of the second vertical coupled cavity.

It may be understood that, the second straight line extends along a thickness direction of a micro-resonant cavity. It should be noted that, in this embodiment of the present invention, the second straight line and the first straight line may be coplanar and parallel, or may intersect with each other, or may be not coplanar, which is not limited in the present invention.

Optionally, if the optical interconnector includes a third optical waveguide, the third optical waveguide may also be used as an input optical waveguide of the second vertical coupled cavity.

In this embodiment of the present invention, a distance between the fourth optical waveguide and the fourth micro-resonant cavity may be 1 nm to 1000 nm.

It should be noted that, in this embodiment of the present invention, values of M and N may be the same or different. Parameters of the second vertical coupled cavity and parameters of the first vertical coupled cavity may be the same or different. The parameters mentioned herein may include a size and a refractive index of a micro-resonant cavity and a distance between each two adjacent micro-resonant cavities. It may also be understood that, the parameters herein may include a resonant wavelength of the vertical coupled cavities.

Figure 8:
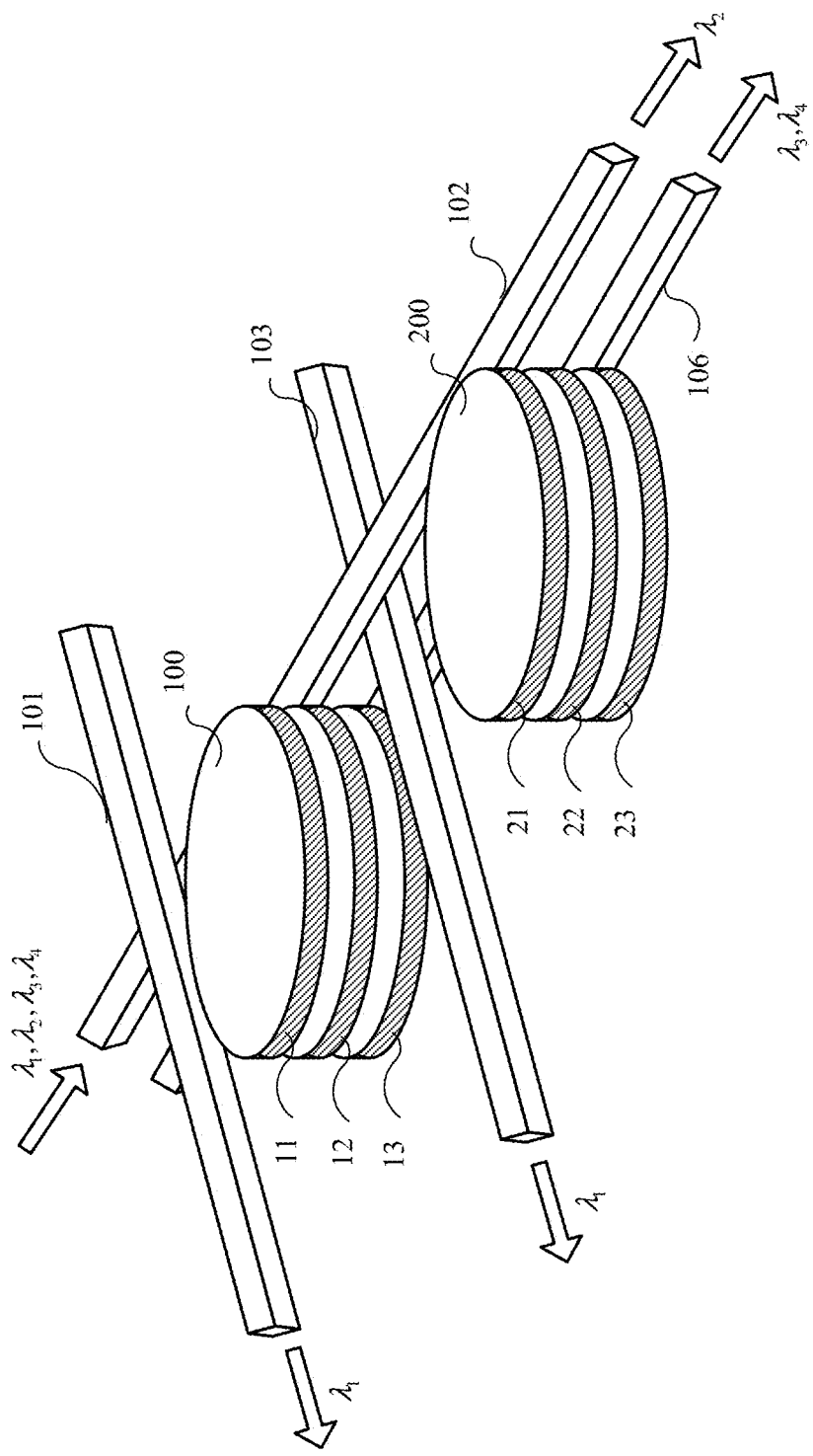
FIG. 8 is a schematic diagram of still another example of an optical interconnector according to an embodiment of the present invention.

For example, for a first vertical coupled cavity when N=3, FIG. 8 shows a schematic diagram of another example of an optical interconnector according to an embodiment of the present invention. It may be understood that, based on the optical interconnector shown in FIG. 4, the optical interconnector in FIG. 8 further includes a second vertical coupled cavity 200 and a fourth optical waveguide 106. In addition, the second vertical coupled cavity is a three-layer vertical coupled cavity, that is, M=3.

The first optical waveguide 102 and the middle layer micro-resonant cavity 12 of the first vertical coupled cavity are in a same plane, and the first optical waveguide 102 and a first outer layer micro-resonant cavity 21 of the second vertical coupled cavity are also in a same plane. The fourth optical waveguide 106 and a second outer layer micro-resonant cavity 23 of the second vertical coupled cavity are in a same plane. It is assumed that the second vertical coupled cavity has a first supermode corresponding to a third resonant wavelength $\lambda_3$ and a second supermode corresponding to a fourth resonant wavelength $\lambda_4$.

The first optical waveguide 102 is not only an input optical waveguide of the first vertical coupled cavity 100, but also an input optical waveguide of the second vertical coupled cavity 200. The second optical waveguide 103 and the third optical waveguide 101 are output optical waveguides of the first vertical coupled cavity 100, and the fourth optical waveguide 106 is an output optical waveguide of the second vertical coupled cavity 200.

In this way, when a sequence of optical signals whose wavelengths are $\lambda_1$, $\lambda_2$, $\lambda_3$, and $\lambda_4$ enters the optical interconnector from the input end of the first optical waveguide 102, because coupling may be performed between the first optical waveguide 102 and the middle layer micro-resonant cavity 12 of the first vertical coupled cavity 100 by means of an evanescent wave, the optical signals may enter the first vertical coupled cavity 100. Further, according to the first supermode and the second supermode of the first vertical coupled cavity 100, it may be determined that an optical signal whose wavelength is $\lambda_1$ may be coupled to the first outer layer micro-resonant cavity 11 and the second outer layer micro-resonant cavity 13. Further, because coupling may be performed between the first outer layer micro-resonant cavity 11 of the first vertical coupled cavity 100 and the third optical waveguide 101 by means of the evanescent wave, and coupling may be performed between the second outer layer micro-resonant cavity 13 and the second optical waveguide 103 by means of the evanescent wave, the optical signal whose wavelength is $\lambda_1$ may enter the third optical waveguide 101 and is output from the output end of the third optical waveguide 101, and the optical signal whose wavelength is $\lambda_1$ may enter the second optical waveguide 103 and is output from the output end of the second optical waveguide 103. The other optical signals whose wavelengths are $\lambda_2$, $\lambda_3$, and $\lambda_4$ may continue to be transmitted along the first optical waveguide 102 and enter the second vertical coupled cavity 200. The two supermodes of the second vertical coupled cavity 200 correspond to the third resonant wavelength $\lambda_3$ and the fourth resonant wavelength $\lambda_4$. Therefore, optical signals whose wavelengths are $\lambda_3$ and $\lambda_4$ may be coupled to the fourth optical waveguide 106 and are output from an output end of the fourth optical waveguide 106. An optical signal whose wavelength is $\lambda_2$ may continue to be transmitted along the first optical waveguide 102, as shown in FIG. 8.

It should be understood that, the optical interconnector in this embodiment of the present invention may also include multiple vertical coupled cavities and multiple optical waveguides. Extensions performed by a person skilled in the art based on this embodiment of the present invention without creative efforts all belong to the protection scope of the present invention.

In this embodiment of the present invention, the optical interconnector may be disposed in a multi-layer switching optical circuit. In this way, when the first optical waveguide and the second optical waveguide are located in different optical circuit layers, cross-layer coupling and inter-layer sharing of an optical signal between the different optical circuit layers can be implemented.

The optical interconnector in this embodiment of the present invention may be manufactured by using a standard complementary metal oxide semiconductor (Complementary Metal Oxide Semiconductor, CMOS) technique. FIG. 9 is a schematic diagram of a technological process for manufacturing the optical interconnector shown in FIG. 3.

Specifically, a commercial silicon on insulator (Silicon On Insulator, SOI) wafer may be used, as shown in FIG. 9(a). A first layer of micro-resonant cavity and a corresponding optical waveguide are formed on the SOI silicon wafer by means of photoetching and inductively coupled plasma (Inductively Coupled Plasma, ICP) dry etching, as shown in FIG. 9(b). It may be understood that, a micro-resonant cavity 91 is the micro-resonant cavity 13 shown in FIG. 3, and an optical waveguide 92 is the second optical waveguide 103 shown in FIG. 3.

Further, a silicon dioxide ($SiO_2$) film is deposited on a surface by using a plasma enhanced chemical vapor deposition (Plasma Enhanced Chemical Vapor Deposition, PECVD) or low pressure chemical vapor deposition (Low Pressure Chemical Vapor Deposition, LPVCD) technology, as shown in FIG. 9(c), and is chemically-mechanically polished, as shown in FIG. 9(d).

Then a silicon wafer whose surface is covered by an oxide layer with a suitable thickness is bonded with the silicon wafer shown in FIG. 9(d) at a high temperature, as shown in FIG. 9(e). A bottom surface thereof is corroded and chemically-mechanically polished, as shown in FIG. 9(f). Next, a second layer of micro-resonant cavity and a corresponding optical waveguide may be similarly formed by means of photoetching and ICP dry etching, as shown in FIG. 9(g). It may be understood that, a micro-resonant cavity 93 is the micro-resonant cavity 12 shown in FIG. 3, and an optical waveguide 94 is the first optical waveguide 102 shown in FIG. 3.

Further, a $SiO_2$ film is similarly deposited on a surface by using the PECVD/LPVCD technology, and is chemically-mechanically polished, which are similar to those in FIG. 9(c) and FIG. 9(d), and not shown in FIG. 9.

Then a silicon wafer whose surface is covered by a same oxide layer with a suitable thickness is bonded with the foregoing silicon wafer at a high temperature, and a bottom surface thereof is corroded and chemically-mechanically polished, as shown in FIG. 9(h). Next, a third layer of micro-resonant cavity may be similarly formed by means of photoetching and ICP dry etching, as shown in FIG. 9(i). It may be understood that, a micro-resonant cavity 95 is the micro-resonant cavity 11 shown in FIG. 3.

Finally, after techniques similar to those in FIG. 9(c) and FIG. 9(d) are performed, a three-layer micro-resonant cavity shown in FIG. 9(j) may be completed.

In this way, a manufacturing process of the optical interconnector shown in FIG. 3 is completed. It should be noted that, in the manufacturing process, it is required to ensure that adjacent layers of micro-resonant cavities are spaced by a same distance.

Another optical interconnector except the optical interconnector shown in FIG. 3 may be manufactured by using a similar technique, which is not described herein again.

In this way, a mature CMOS technique is used to manufacture in this embodiment of the present invention. A processing technique of the CMOS technique is simple, and can be applied to low-cost and large-scale manufacture.

FIG. 10 is a structural diagram of an optoelectronic chip system according to an embodiment of the present invention. The optoelectronic chip system 900 shown in FIG. 10 includes an optical circuit layer 901 and a circuit layer 902. The optical circuit layer 901 includes a laser 911, a modulator 912, a detector 913, and a multi-layer switching optical circuit 914, where the multi-layer switching optical circuit 914 includes the optical interconnector 915 according to any one of FIG. 3 to FIG. 8. The circuit layer 902 includes an encoder 921, a controller 922, and a processor 923.

The laser 911 is configured to input a first optical signal for the modulator 912. The encoder 921 is configured to input an electrical signal for the modulator 912. The modulator 912 modulates the first optical signal and the electrical signal into a second optical signal, and inputs the second optical signal to the multi-layer switching optical circuit 914. The controller 922 is configured to input a control signal for the optical interconnector 915. The detector 913 is configured to receive an output signal of the multi-layer switching optical circuit 914. The processor 923 is configured to process an output signal of the detector 913.

Specifically, the encoder 921 is configured to provide electrical signals in various modulation formats for the modulator 912. The modulator 912 loads an electrical signal received from the encoder 921 to the first optical signal input by the laser 911, and inputs the second optical signal obtained after modulation is performed to the multi-layer switching optical circuit 914. The controller 922 is configured to provide a control signal for the optical interconnector 915, so that dynamic routing of an inter-layer optical circuit in the multi-layer switching optical circuit can be implemented.

It should be noted that, the optoelectronic chip system 900 in this embodiment of the present invention may further include a memory (not shown in the figure).

It may be understood that, the memory in this embodiment of the present invention may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary rather than limited description, RAMs in many forms may be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). The memory in this embodiment of the present invention may include, but not limited to, the foregoing memories and any other memory of a suitable type.

FIG. 11 is a flowchart of an optical signal sharing method according to an embodiment of the present invention. The method shown in FIG. 11 includes:

1101: A first optical waveguide of an optical interconnector receives a first optical signal, where the optical interconnector is the optical interconnector described above in the present invention.

1102: A first vertical coupled cavity of the optical interconnector couples the first optical signal into a second optical signal, where both the first optical signal and the second optical signal include an optical signal having a first resonant wavelength.

1103: A second optical waveguide of the optical interconnector outputs the second optical signal.

The optical interconnector in this embodiment of the present invention couples an optical signal having a first resonant wavelength from a first optical waveguide to a second optical waveguide, which can implement optical signal sharing between different layers.

The optical interconnector in this embodiment of the present invention includes a first vertical coupled cavity, a first optical waveguide, and a second optical waveguide. The first vertical coupled cavity includes N identical micro-resonant cavities, centers of the N identical micro-resonant cavities are located on a first straight line, the first straight line is perpendicular to a plane on which each micro-resonant cavity of the N identical micro-resonant cavities is located, and each two adjacent micro-resonant cavities in the N identical micro-resonant cavities are spaced by a same distance, where N is an odd number that is greater than or equal to 3. The first optical waveguide and a first micro-resonant cavity in the N identical micro-resonant cavities are in a same plane, and the second optical waveguide and a second micro-resonant cavity in the N identical micro-resonant cavities are in a same plane. The first optical waveguide is an input optical waveguide of the first vertical coupled cavity, and the second optical waveguide is a first output optical waveguide of the first vertical coupled cavity.

Optionally, in an embodiment, the method may further include: coupling, by the first vertical coupled cavity of the optical interconnector, the first optical signal into a third optical signal, where both the first optical signal and the third optical signal include an optical signal having a second resonant wavelength; and outputting, by a third optical waveguide of the optical interconnector, the third optical signal.

Optionally, the optical interconnector may further include a second vertical coupled cavity and a fourth optical waveguide.

The second vertical coupled cavity of the optical interconnector couples the first optical signal into a fourth optical signal, where both the first optical signal and the fourth optical signal include an optical signal having a third resonant wavelength, and the fourth optical waveguide of the optical interconnector outputs the fourth optical signal.

Alternatively, the second vertical coupled cavity of the optical interconnector couples the second optical signal into a fourth optical signal, where the fourth optical signal includes the optical signal having the first resonant wavelength, and the fourth optical waveguide of the optical interconnector outputs the fourth optical signal.

In this embodiment of the present invention, for an optical signal sharing method when N is equal to 3, reference may be made to a corresponding description in FIG. 3 to FIG. 8. To avoid repetition, details are not provided herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, which should be understood as that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed.

In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical interconnector comprising:
    a first vertical coupled cavity;
    a first optical waveguide; and
    a second optical waveguide, wherein
        the first vertical coupled cavity comprises N identical micro-resonant cavities, centers of the N identical micro-resonant cavities are located on a first straight line, the first straight line is perpendicular to a plane on which each micro-resonant cavity of the N identical micro-resonant cavities is located, and each two adjacent micro-resonant cavities in the N identical micro-resonant cavities are spaced by a same distance, wherein N is an odd number that is greater than or equal to 3; and
        the first optical waveguide and a first micro-resonant cavity in the N identical micro-resonant cavities are in a same plane, the second optical waveguide and a second micro-resonant cavity in the N identical micro-resonant cavities are in a same plane, the first optical waveguide is an input optical waveguide of the first vertical coupled cavity, the second optical waveguide is a first output optical waveguide of the first vertical coupled cavity, and an optical signal having a first resonant wavelength in the first optical waveguide enters the second optical waveguide through the first vertical coupled cavity;
    wherein N is equal to 3, and the first vertical coupled cavity comprises a first outer layer micro-resonant cavity, a second outer layer micro-resonant cavity, and a middle layer micro-resonant cavity;
    wherein the first micro-resonant cavity is the first outer layer micro-resonant cavity and the second micro-resonant cavity is the second outer layer micro-resonant cavity; or the first micro-resonant cavity is the middle layer micro-resonant cavity and the second micro-resonant cavity is the first outer layer micro-resonant cavity or the second outer layer micro-resonant cavity.

2. The optical interconnector according to claim 1, wherein the optical interconnector further comprises a third optical waveguide, wherein the third optical waveguide and a third micro-resonant cavity in the N identical micro-resonant cavities are in a same plane, the third optical waveguide is a second output optical waveguide of the first vertical coupled cavity, and wherein an optical signal having a second resonant wavelength in the first optical waveguide enters the third optical waveguide through the first vertical coupled cavity.

3. The optical interconnector according to claim 1, wherein an optical signal having a second resonant wavelength in the first optical waveguide enters the second optical waveguide through the first vertical coupled cavity.

4. The optical interconnector according to claim 1, wherein the optical interconnector further comprises positive and negative electrodes, wherein the first vertical coupled cavity is disposed between the positive and negative electrodes, and the positive and negative electrodes are configured to adjust a refractive index of the first vertical coupled cavity.

5. The optical interconnector according to claim 1, wherein the optical interconnector further comprises two piezoelectric ceramics, wherein the first vertical coupled cavity is disposed between the two piezoelectric ceramics, and the two piezoelectric ceramics are configured to adjust the distance between each two adjacent micro-resonant cavities in the first vertical coupled cavity.

6. The optical interconnector according to claim 1, wherein the optical interconnector further comprises a first wavelength converter, wherein the first wavelength converter is disposed at an input end of the first optical waveguide, and the first wavelength converter is configured to adjust a wavelength of an optical signal input by the first optical waveguide.

7. The optical interconnector according to claim 1, wherein the optical interconnector further comprises a second wavelength converter, wherein the second wavelength converter is disposed at an output end of the second optical waveguide, and the second wavelength converter is configured to adjust a wavelength of an optical signal output by the second optical waveguide.

8. The optical interconnector according to claim 1, wherein a shape of each of the N identical micro-resonant cavities is one of the following:
    a circle, an ellipse, and a regular polygon.

9. The optical interconnector according to claim 1, wherein a distance between the first optical waveguide and the first micro-resonant cavity is 1 nm to 1000 nm, and a distance between the second optical waveguide and the second micro-resonant cavity is 1 nm to 1000 nm.

10. The optical interconnector according to claim 1, wherein the distance between each two adjacent micro-resonant cavities in the N identical micro-resonant cavities are 1 nm to 1000 nm.

11. The optical interconnector according to claim 1, wherein the optical interconnector further comprises a second vertical coupled cavity and a fourth optical waveguide, wherein
the second vertical coupled cavity comprises M identical micro-resonant cavities, centers of the M identical micro-resonant cavities are located on a second straight line, the second straight line is perpendicular to a plane on which each micro-resonant cavity of the M identical micro-resonant cavities is located, and each two adjacent micro-resonant cavities in the M identical micro-resonant cavities are spaced by a same distance, wherein M is an odd number that is greater than or equal to 3; and
the fourth optical waveguide and a fourth micro-resonant cavity in the M identical micro-resonant cavities are in a same plane, the first optical waveguide or the second optical waveguide is an input optical waveguide of the second vertical coupled cavity, and the fourth optical waveguide is an output optical waveguide of the second vertical coupled cavity.

12. An optoelectronic chip system comprising:
an optical circuit layer the optical circuit layer comprises a laser, a modulator, a multi-layer switching optical circuit, and a detector, wherein the multi-layer switching optical circuit comprises a optical interconnector, wherein the optical interconnector comprises
a first vertical coupled cavity;
a first optical waveguide; and
a second optical waveguide, wherein
the first vertical coupled cavity comprises N identical micro-resonant cavities, centers of the N identical micro-resonant cavities are located on a first straight line, the first straight line is perpendicular to a plane on which each micro-resonant cavity of the N identical micro-resonant cavities is located, and each two adjacent micro-resonant cavities in the N identical micro-resonant cavities are spaced by a same distance, wherein N is an odd number that is greater than or equal to 3; and
the first optical waveguide and a first micro-resonant cavity in the N identical micro-resonant cavities are in a same plane, the second optical waveguide and a second micro-resonant cavity in the N identical micro-resonant cavities are in a same plane, the first optical waveguide is an input optical waveguide of the first vertical coupled cavity, the second optical waveguide is a first output optical waveguide of the first vertical coupled cavity, and an optical signal having a first resonant wavelength in the first optical waveguide enters the second optical waveguide through the first vertical coupled cavity; and
a circuit layer, wherein the circuit layer comprises an encoder, a controller, and a processor, wherein
the laser is configured to input a first optical signal for the modulator;
the encoder is configured to input an electrical signal for the modulator;
the modulator modulates the first optical signal and the electrical signal into a second optical signal, and inputs the second optical signal to the multi-layer switching optical circuit;
the controller is configured to input a control signal for the optical interconnector;
the detector is configured to receive an output signal of the multi-layer switching optical circuit; and
the processor is configured to process an output signal of the detector.

13. The optoelectronic chip system of claim 12, wherein N is equal to 3, and the first vertical coupled cavity comprises a first outer layer micro-resonant cavity, a second outer layer micro-resonant cavity, and a middle layer micro-resonant cavity;
wherein the first micro-resonant cavity is the first outer layer micro-resonant cavity, and the second micro-resonant cavity is the second outer layer micro-resonant cavity; or the first micro-resonant cavity is the middle layer micro-resonant cavity, and the second micro-resonant cavity is the first outer layer micro-resonant cavity or the second outer layer micro-resonant cavity; and
wherein an optical signal having a second resonant wavelength in the first optical waveguide enters the second optical waveguide through the first vertical coupled cavity.

14. An optical signal sharing method comprising:
receiving, by a first optical waveguide of an optical interconnector, a first optical signal;
coupling, by a first vertical coupled cavity of the optical interconnector, the first optical signal into a second optical signal, wherein both the first optical signal and the second optical signal comprise an optical signal having a first resonant wavelength; and
outputting, by a second optical waveguide of the optical interconnector, the second optical signal, wherein the optical interconnector comprises
a first vertical coupled cavity;
a first optical waveguide; and
a second optical waveguide, wherein
the first vertical coupled cavity comprises N identical micro-resonant cavities, centers of the N identical micro-resonant cavities are located on a first straight line, the first straight line is perpendicular to a plane on which each micro-resonant cavity of the N identical micro-resonant cavities is located, and each two adjacent micro-resonant cavities in the N identical micro-resonant cavities are spaced by a same distance, wherein N is an odd number that is greater than or equal to 3; and
the first optical waveguide and a first micro-resonant cavity in the N identical micro-resonant cavities are in a same plane, the second optical waveguide and a second micro-resonant cavity in the N identical micro-resonant cavities are in a same plane, the first optical waveguide is an input optical waveguide of the first vertical coupled cavity, the second optical waveguide is a first output optical waveguide of the first vertical coupled cavity, and an optical signal having a first resonant wavelength in the first optical waveguide enters the second optical waveguide through the first vertical coupled cavity;
coupling, by the first vertical coupled cavity of the optical interconnector, the first optical signal into a third optical signal, wherein both the first optical signal and the third optical signal comprise an optical signal having a second resonant wavelength; and outputting, by a third optical waveguide of the optical interconnector, the third optical signal.

15. The method according to claim 14, wherein the method further comprises:

coupling, by a second vertical coupled cavity of the optical interconnector, the first optical signal into a fourth optical signal, wherein both the first optical signal and the fourth optical signal comprise an optical signal having a third resonant wavelength; and outputting, by a fourth optical waveguide of the optical interconnector, the fourth optical signal.

16. The method according to claim 14, wherein the method further comprises:

coupling, by a second vertical coupled cavity of the optical interconnector, the second optical signal into a fourth optical signal, wherein the fourth optical signal comprises the optical signal having the first resonant wavelength; and outputting, by a fourth optical waveguide of the optical interconnector, the fourth optical signal.

17. The method according to claim 14, wherein N is equal to 3, and the first vertical coupled cavity comprises a first outer layer micro-resonant cavity, a second outer layer micro-resonant cavity, and a middle layer micro-resonant cavity;

wherein the first micro-resonant cavity is the first outer layer micro-resonant cavity, and the second micro-resonant cavity is the second outer layer micro-resonant cavity; or the first micro-resonant cavity is the middle layer micro-resonant cavity, and the second micro-resonant cavity is the first outer layer micro-resonant cavity or the second outer layer micro-resonant cavity; and wherein an optical signal having a second resonant wavelength in the first optical waveguide enters the second optical waveguide through the first vertical coupled cavity.

* * * * *